Feb. 10, 1953 G. L. HURST ET AL 2,627,670
DRIER
Filed Dec. 30, 1948 2 SHEETS—SHEET 1
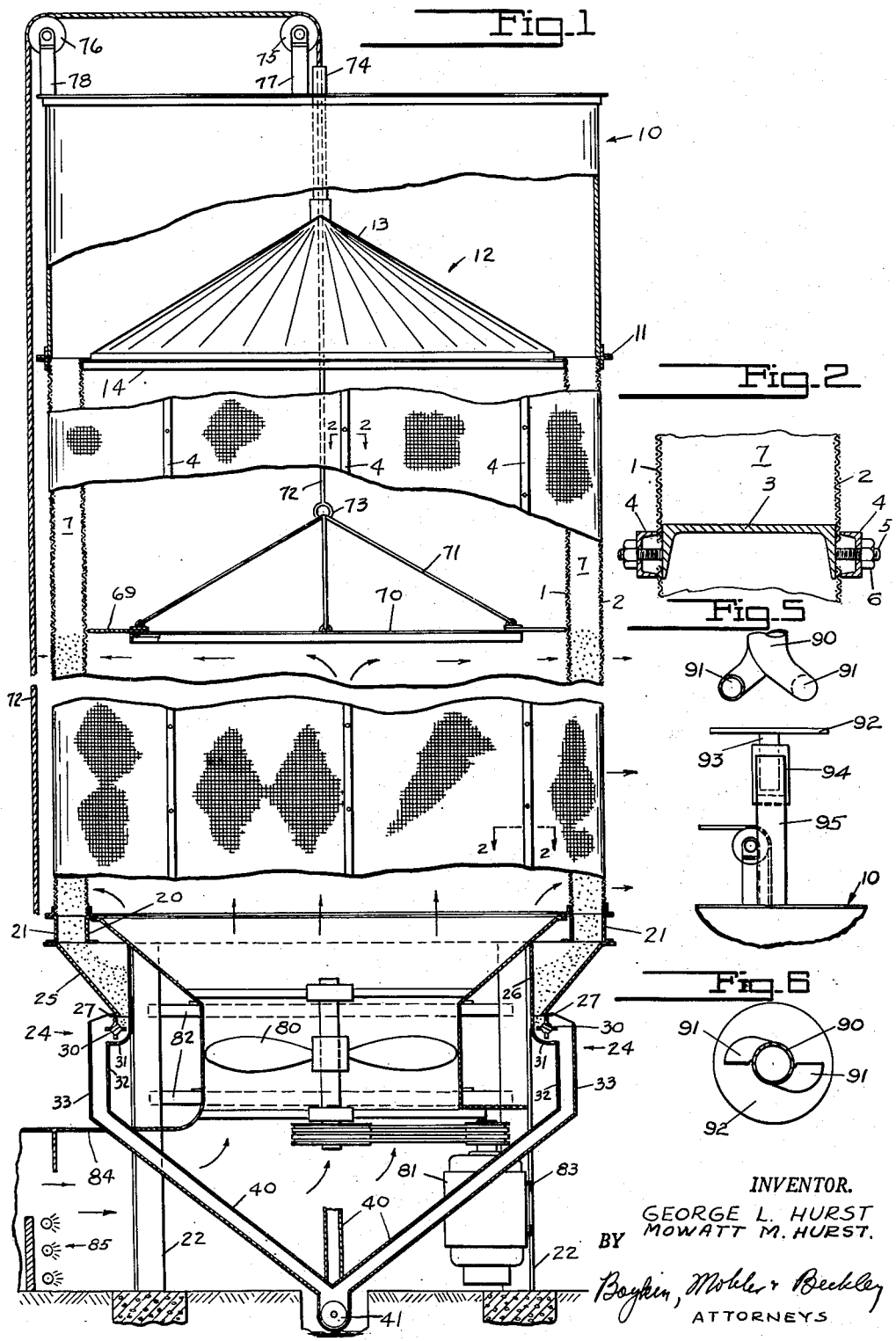
INVENTOR.
GEORGE L. HURST
MOWATT M. HURST.
BY
Boykin, Mohler & Beckley
ATTORNEYS Feb. 10, 1953 G. L. HURST ET AL 2,627,670
DRIER
Filed Dec. 30, 1948 2 SHEETS—SHEET 2

INVENTOR.
GEORGE L. HURST
MOWATT M. HURST
BY
Boyken, Mohler & Beckley
ATTORNEYS.

Patented Feb. 10, 1953

2,627,670

UNITED STATES PATENT OFFICE 2,627,670

DRIER

George L. Hurst, Los Altos, and Mowatt M. Hurst, Palo Alto, Calif.

Application December 30, 1948, Serial No. 68,176

6 Claims. (Cl. 34—87)

This invention relates to driers and more particularly to that type of drier which is employed to remove moisture from edible seeds of various plants, such as rice, corn and beans by providing a flow of heated air through a mass of the product to be dried.

Heretofore, particularly in the drying of rice paddy, it has been customary to feed the paddy by gravity between vertical, horizontally spaced screens. A pair of such screens has usually formed each of two opposite sides of a rectangular vertically disposed tower thus providing a central vertical passageway between the two pairs of screens for heated air. The other two opposite sides of the tower have been imperforate, and a closure has been provided at the upper end of the central passageway.

Upon forcing hot air into the central vertical passageway of a tower, as above described, the said air will pass through the rice paddy that is between the screens, drying the paddy. A continuous feed of paddy to the upper ends of the spaces between the pairs of screens is maintained and the paddy is gradually drawn from the lower ends of the spaces between said screens. By regulating the speed of downward movement of the paddy that is between the screens, and the temperature of the air, the paddy that is withdrawn is dried to a predetermined degree.

It is obvious from the above description, that unless the space between the screens is kept filled to the level of the closure that covers the upper end of the central passageway, the hot air will not effectively dry the paddy, but will be exhausted through any gap that might exist between the level of the paddy between the screens and said closure.

A gap, such as above noted, inevitably occurs in driers heretofore provided when the drier is emptied at the end of a run. All of the paddy that is in the space between the screens at the end of each run of paddy, is ineffectively dried. This rice is stored with the previously dried rice for a predetermined time until its moisture content has more or less reached that of the remainder, and then the rice may again be run through the driers, until the moisture content has reached the desired minimum for milling.

By the present invention, the last portion of rice that heretofore has been ineffectively dried, as above described, is dried to the same degree as the remainder, thus materially reducing the time required for drying the entire lot as well as reducing the likelihood of spoilage through fermentation by reducing the moisture content to a lower degree at each run through the drier than heretofore.

In the past, the drying operation in driers of the above type cannot commence until the entire space between the screens from the bottom to the stationary top closure at the top of each tower is filled with rice. When such drying commences, it is necessary to commence withdrawing rice from the bottom of the tower so as not to overheat the descending rice that is at the upper end. As a result, the major charge of rice between the screens is ineffectively dried. Only that rice at the top of the tower will be properly dried by the time it reaches the bottom.

By the present operation, all of the rice may be properly dried from the beginning to the end of a drying operation.

One of the objects of this invention is the provision of a drier which will dry the material uniformly throughout the entire drying process, thus minimizing the amount of material rejected.

Another object of the invention is the provision of a drier which may be easily regulated to provide any predetermined drying effect.

A further object is an improved method of drying rice and the like for uniformly drying an entire batch.

Still another object of the invention is the provision of a drier which is economical to build and to operate and which provides greater drying area than other driers of comparable size.

Further objects and advantages will be obvious from the attached drawings and specification.

In the drawings Fig. 1 is an elevational view of the drier partly broken away and in section to show structure.

Fig. 2 is an enlarged sectional view of the means employed to connect the drier screens to the vertical column members of the drier as seen along line 2—2 of Fig. 1.

Fig. 5 is an elevational view of the distributing means, for filling the drier and spreading the material to be dried uniformly around the drying space.

Fig. 6 is a plan view of the distributing means shown in Fig. 5.

Figure 3:
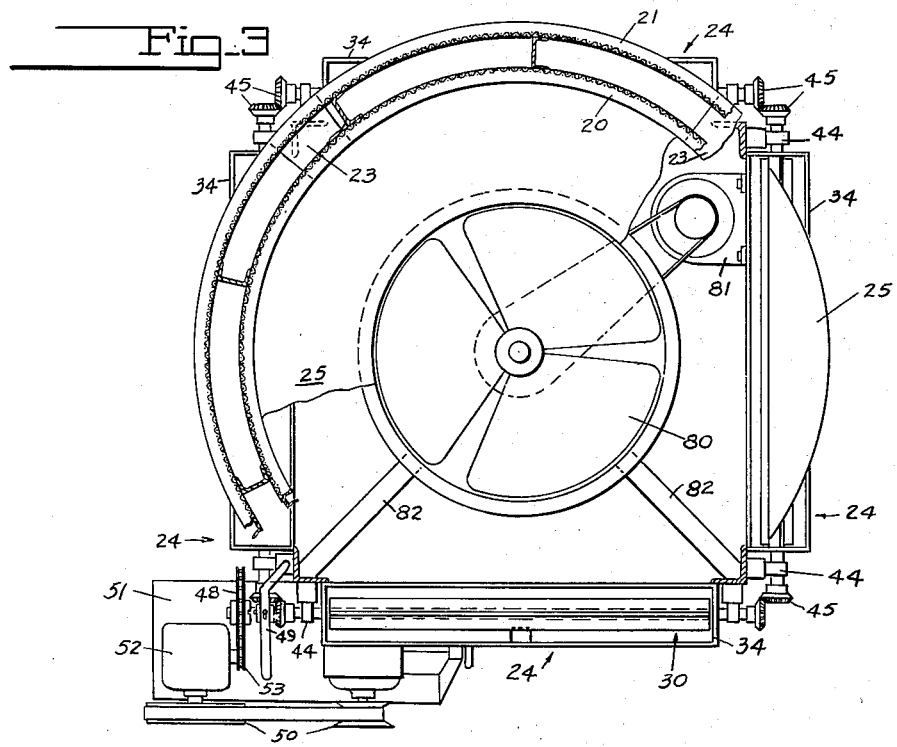
Fig. 3 is a sectional plan view partially broken away to show the discharge rollers and their associated mechanism.

The drying space 7 is defined generally by two vertical concentric cylindrical screens 1, 2 between which the material to be dried is adapted to pass downwardly by gravity. The screens are preferably installed in cylindrical segments which are secured to vertical column members 3 by channel members 4 positioned longitudinally of said column members and adapted to secure the vertical edges of the screens between the flanges of said vertical column members and said channels by means of studs 5 and nuts 6 (Fig. 2).

The inherent strength of said cylindrical segments provides a stronger structure than would be obtained, if the segments were flat. Transverse stiffeners may thus be eliminated and the effective drying area thereby increased.

A reservoir, or feed hopper, generally designated 10, adapted to contain material to be dried is positioned at the upper end of the drying space 7 and is connected by welding to the drier to the outer edges of vertical column members 3. Circumferential angles 11 are welded to the reservoir 10 and screen 2 adjacent the lower edge of reservoir 10 to stiffen the reservoir and screen at that point.

Reservoir 10 is a tank-like member having cylindrical sidewalls and open at its upper end and material to be dried may be fed into said reservoir by a spout 99 (Fig. 5) which in turn may be connected with any suitable conveyor (not shown). The bottom 12 of the reservoir comprises a cone 13 preferably of sheet steel, positioned coaxial with the drier. The base of the cone is connected to the inner sides of vertical column members 3 by a circumferential angle 14 within said inner screen 1 which angle is in turn rigidly connected by welding to said vertical column members 3 by a circumferential angle 14 within said inner screen 1 which angle is in turn rigidly connected by welding to said vertical column members 3 with screen 2 secured between said vertical column member 3 and said angle 14.

The vertical column members 3 are rigidly connected at their lower ends to spaced concentric members 20, 21. These members 20, 21 are preferably channels bent in the form of a circle and the inner channel member 20 is disposed with its flanges extending radially inwardly from its web, and the outer channel member is disposed with its flanges extending radially outwardly from its web. The vertical column members 3 are disposed between the concentric channel members 20, 21 and are welded adjacent their lower ends along the opposed webs of the concentric channel members 20, 21.

Support members or posts 22, preferably four in number, are positioned under the channel members 20, 21 and are equally spaced from each other. These support members 22 are rigidly secured at their upper ends to cap plates 23 which in turn are rigidly secured to the concentric channel members 20, 21 (Fig. 3).

As best seen in Fig. 3 the support members 22 also serve to support four troughs generally designated 24 which troughs are adapted to receive the dried material after it has passed downwardly through the drying space 7. Between the drying space 7 and each trough 24 is a warped plate 25 which is adapted to transfer the dried material from drying space 7 to trough 24. Said warped plate is provided with an arcuately extending upper edge which is rigidly connected to the lower inner edge of outer channel member 21 and a straight lower edge positioned longitudinally of said trough and bent partially back upon itself to form a horizontal outwardly extending flange 27 for a purpose to be described.

Disposed within each trough 24 and extending longitudinally thereof is a discharge roller generally designated 30 and comprising a shaft 42 and a plurality of rigid blades 43 extending longitudinally and radially of said shaft and rigidly connected thereto at spaced points around the same.

The trough 24 includes two opposed sidewalls 32, 33 and endwalls 34. The inner side wall 32 nearer the center of the drier is substantially coplanar with the outer longitudinal edge of roller 30 and the top of said inner side wall 32 terminates under the roller 30 and is spaced a slight distance downwardly therefrom. A curved portion 31 of trough 24 forms an extension of side wall 32 and is curved to a radius slightly greater than the radius of the roller and is concentric with said roller. An upwardly extending flat portion 26 forms an extension of curved portion 31 and is secured to the supports 22.

The ends walls 34 of each trough 24 extend convergently downwardly from their upper ends and terminate centrally of the length of said trough below the latter in a downspout 40. The downspout 40 of each trough is adapted to communicate with a screw conveyor 41 or other convenient means for moving away the dried material.

Thus it may be seen that when the product to be dried is placed in the reservoir 10 it will fill up the space 7 between screens 1 and 2 and also the space in the trough above the roller 30. None of the material may enter the trough between sidewalls 32, 33 when the roller 30 is stationary because the roller substantially fills the space between flange 27 and curved portion 31. It is obvious that the amount of product discharged by the roller when the roller is rotated is proportional to the speed of rotation of said roller.

Figure 4:
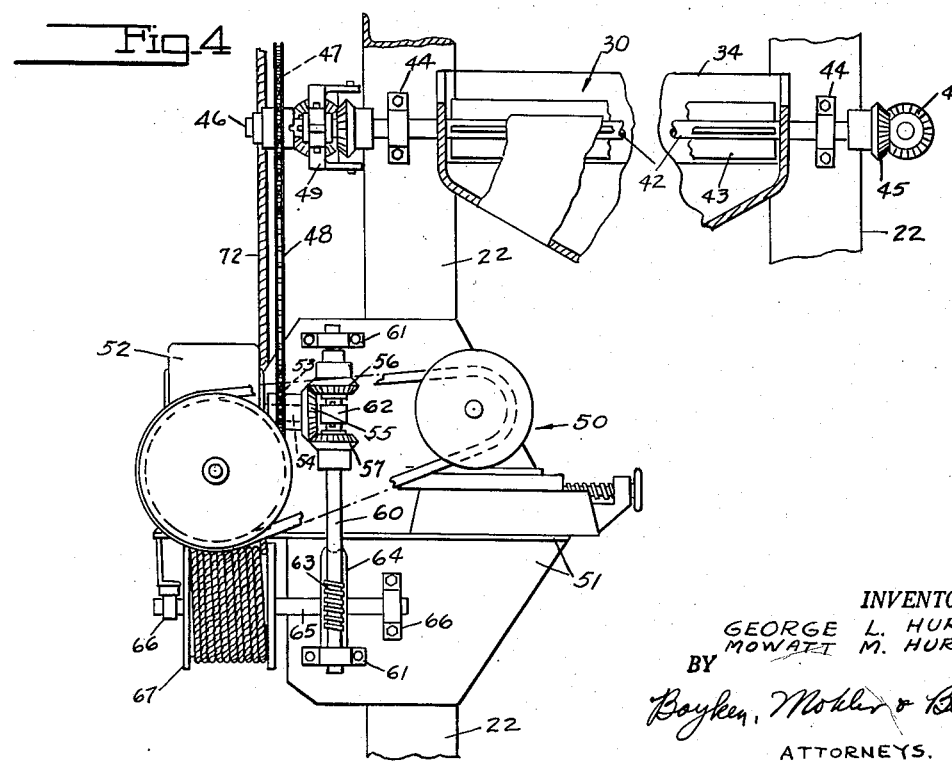
Fig. 4 is an elevational view of the mechanism for driving the discharge rollers and the movable closure.

Each roller 30 is actuated by shaft 42 which shaft extends through end walls 34 of trough 24 (Fig. 4) and is journalled in bearings 44 secured to supports 22. The four roller shafts 42 are interconnected at their adjacent ends for simultaneous rotation by bevel gears 45. Thus rotation of one shaft causes a corresponding rotation of all shafts. One shaft is provided with an extension 46 on which a sprocket wheel 47 is mounted and which is adapted to be driven by chain 48. Between sprocket wheel 47 and bevel gear 45 on the shaft having the extension 46 is a clutch 49 adapted to be manually actuatable to transmit torque to rollers 30 from sprocket wheel 47. The shafts carrying the bevel gears may be stopped while the sprocket 47 is rotating by placing clutch 49 in neutral position.

A variable speed drive 50 such as the "Reeves" type is mounted on one of the supports 22 by a suitable bracket support 51 and is adapted to drive chain 48 at a relatively slow rate of speed through speed reducer 52. Sprocket wheel 53 rotatably secured to reducer 52 by shaft 54 drives the chain 48.

Bevel gear 55 is also secured to shaft 54 and transmits rotation through bevel gears 56, 57 to shaft 60 which is rotatably mounted vertically on support 51 by means of bearings 61. A clutch 62 of the conventional reversing type is positioned on shaft 60 between bevel gears 56 and 57 so that the direction of rotation of shaft 60 may be reversed by manually operating clutch 62. Shaft 60 carries, adjacent its lower end, a worm 63 adapted to drive worm gear 64 secured to shaft 65 and which shaft is rotatably secured to support 51 by means of bearings 66. Also supported on shaft 65 is a drum 67 for a purpose to be later described in detail.

Disposed horizontally within the drier is a movable closure 70 (Fig. 1) preferably made of steel and supported at spaced points around its periphery by rope slings 71 which are connected to a rope 72 coaxial with the drier by means of a ring 73.

The diameter of movable closure 70 is preferably made substantially less than the inner diameter of inner screen 1 and an annular ring 69 of yieldable material such as leather, or composition material, is secured adjacent the periphery of said movable baffle so that the outer diameter of the annular ring 69 is practically the same, but may be slightly less than the inner diameter of screen 1.

The conical base of the reservoir 12 is centrally apertured to allow the rope 72 to pass through the same and a vertical pipe 74 is rigidly secured to the apex of the cone formed by side walls 13 to enclose and separate the rope 72 from the material in the reservoir.

The rope 72 passes up through pipe 74 and through the top of the reservoir, then over sheave 75, then radially outwardly and over sheave 76, then vertically downwardly and connects with drum 67 which is adapted to raise and lower the movable closure 70. Sheaves 75, 76 may be rotatably supported to the top of the reservoir by supports 77, 78.

An axial-flow fan 80 is adapted to be driven by motor 81 for directing a continuous stream of air upwardly through the drier. Fan 80 is secured to the supports 22 by cross pieces 82 and the motor 81 is secured to supports 22 by angles 83.

The air supplied to the fan 80 enters the drier through a duct generally designated 84 which may be of sheetmetal or the like. The air is heated prior to passing through the fan by burners 85 which may be fueled by oil or gas. Such heating means is old and is not a part of this invention except insofar as it is combined with other features herein disclosed. The general flow of air is indicated by arrows in Fig 1.

From the foregoing description, it will be seen that when the drier is filled with material such material may or may not extend a substantial distance into reservoir 10, but it must extend to the level of the closure 70 or else most of the drying air would be exhausted through any gap between the closure 70 and the upper level of the material. Usually the material does extent into the reservoir 10, but in any event it is desirable that the upper level of the material be substantially level, particularly when the upper level of the material descends into the space between the screens as the drier is being emptied or filled.

In order to insure that the upper surface of the material will be substantially in a horizontal plane parallel with the plane in which the annular member 69 of the closure is disposed, a special feeder is provided substantially centrally above the drier and reservoir 10 in the form of a downwardly directed conduit 90 that is adapted to receive material from any suitable conveyor, such as a screw conveyor (not shown).

The lower end of this conduit is pivoted with several discharge spouts 91 that may have their outlets directed slightly downwardly and tangentially relative to a circle concentric with the reservoir and screens 1, 2. These outlets open in the same direction circumferentially of such circle so that material discharged therefrom and onto a horizontal plate therebelow will tend to rotate such plate in one direction.

A horizontal receiving plate 92 is so disposed below spouts 91 to receive the material discharged from the latter, and this plate is centrally secured to the upper end of a vertical shaft 93 that is in turn rotatably supported on a bearing 94. Bearing 94 may be carried on reservoir 10 by supports 95.

From the foregoing, it will be seen that the material, such as rice paddy etc., that is discharged onto plate 92 will cause the latter to rotate in one direction and such material will be flung outwardly of said plate to or toward the upper open end of the space between screens 1, 2 in a uniform quantity at all points around such open end.

As has been explained already, in previous driers of the type herein described, the top of the hot air flue within the inner screen 1 has constituted either the rigid bottom 13 of the reservoir 10 or a fixed top. In such instances, when the drier is empty and is to be used for drying a batch of material, the space between the screens must be filled clear to the top before the drying operation commences. Otherwise, the hot air would pass through the screens above the level of the material and would not pass through the material.

After the drier is filled (in the conventional drier), it will be seen that the discharge rollers must commence to discharge the material from the lower end at a rate that will effect a proper drying of the top portion of the material by the time it reaches the discharge rollers. Thus the entire charge of material that is in the drier at the commencement of the drying operation will be insufficiently dried, except for the topmost portion Of course, once the initial charge is out of the drier, the remainder that is constantly fed to the upper ends of the screens will be correctly dried, except for the final charge at the time the drier is emptied. This is due to the fact that as soon as a gap exists between the top level of the material and the top closure of the central hot air flue, the hot air will no longer pass through the material.

In operation in the present instance, at the start, the closure 70 is lowered within the inner screen until it is at the lower end of the screen, and then as the rice paddy or other material is fed into the space between the screens the fan 80 may be started and the closure 70 progressively raised at a rate of speed equal to that at which the level of the material between the screens rises. The discharge rollers are not actuated until the material at the bottom of the screens has been subjected to the hot air a sufficient length of time and then the rollers are actuated at a rate of speed that will result in the discharge of only that material that has been subjected to the drying air the proper time. This rate will be substantially constant and the screens will usually be filled to capacity by the time the discharge commences, but if not, the rate of discharge can be regulated to insure a filled drier without over-drying or materially under-drying the material at the start of operations.

At the completion of a drying operation, but when the drier is still filled, the closure 70 is lowered within the inner screen at the same rate as the level of the material descends, thus properly drying the last of the material during the operation of emptying the drier.

From the foregoing description, it is seen that the method employed is one of progressively forming a cylindrical column of rice paddy or of the material to be dried and constantly passing drying air through the sides of said column during the formation thereof and after its formation. After the column is formed the hot air passes through the same continuously from the inside outwardly, and the column so formed progressively descends or is withdrawn at its lower end while being built up at the same rate at its upper end. Finally, at the finish of the batch being dried, the column of material descends and the space within its upper end is closed at the descending upper level of the column whereby substantially all of the air that is moved upwardly within said column will pass through the walls thereof.

This invention is applicable to columns that are cylindrical or to the conventional rectangular driers having pairs of spaced screens at two only of the opposed sides thereof, although its application to the cylindrical column is preferable because of the simplicity thereof.

In the present invention the ratio between the speed of rotation of rollers 30 and the speed of rotation of drum 67 is predetermined so that the top closure 70, in moving downwardly is always substantially coplanar with the upper surface of the material between the screens. The variable speed drive 59 permits accurate adjustment of drying time by varying the speed of the discharge rollers and closure 70. The ratio of the speed of the discharge rollers to the speed of the closure 70 is usually constant but may be changed as the materials or characteristics of the materials being dried vary.

We claim:

1. In a drier, the combination comprising: a vertically disposed passageway for air having double perforate walls providing a space between which the material to be dried is adapted to descend by gravity as the same is withdrawn from the lower end of said space; means for causing upward movement of air in said passageway, a closure at the upper end of said passageway for obstructing escape from said end whereby said air will pass through said walls and the material therebetween, means for withdrawing said material from said lower end, said closure being movable downwardly with said passageway, means supporting said closure for said movement in a position substantially at the upper level of material in said space, and means for effecting said movement at substantially the same rate of speed as that at which the upper level of said material within said space is adapted to descend during said withdrawal thereof from said lower end, said last mentioned means being operatively connected with said means for withdrawing said material.

2. A drier of the character described comprising a vertical tower having side walls defining a central vertical flue, a closure at the upper end of said flue closing the latter, each of the side walls of said tower at all sides thereof being formed of a pair of spaced opposed vertical screens providing a space between them for downward passage of material to be dried, means for supplying heated air to said flue for lateral passage through said screens and through the material between them, feed means for supplying material to the upper end of the space between said screens for downward passage between them, a plurality of horizontally extending rollers having radially extending vanes thereon disposed adjacent the lower end of the space between said screens for withdrawing said material between said screens upon rotation of said rollers, means for rotating said rollers, means supporting said closure for downward movement within said flue, and said means for rotating said rollers being connected with said closure for causing said movement of the latter at the same rate of speed as the descending upper level of material between said screens when the feed means is inoperative and the rollers are rotated.

3. A drier comprising a pair of concentric, vertical, spaced, tubular screen walls, disposed one within the other providing a vertically extending cylindrical space between them for material to be dried and a central flue within the inner of said walls for heated air, a stationary generally conical top wall closing the upper end of said inner tubular wall and an imperforate tubular wall on the outer of said tubular walls in upward extension thereof, said conical top wall extending divergently downwardly from its apex with the lower edges thereof at about the lower edges of said imperforate wall whereby said imperforate wall and said top wall will coact to define a feed hopper for directing material on said top wall into the space between said tubular screen wall at the upper end of the latter, means for supplying heated air into said flue through its lower end for passage of such air through said screen walls and through the material between them, means for withdrawing said material from the lower end of the space between said screen walls and feed means for supplying said material into said feed hopper, a closure within the inner screen wall of said pair supported for vertical reciprocable movement thereon axially thereof from the upper end of said inner screen wall to the lower end thereof, the edges of said closure being substantially in engagement with the inner sides of said inner screen wall for preventing passage of any substantial amount of heated air between the inner sides of said inner tubular screen and the peripheral edges of said closure, and means for causing said movement of said closure, a closure within the inner screen wall of said pair supported for vertical reciprocable movement thereon axially thereof from the upper end of said inner screen wall to the lower end thereof, stationary structural members projecting slightly radially inwardly from the inner sides of said screen wall, said closure including a flexible marginal portion adapted to engage and yieldably pass over said structural members upon said movement of said closure within said tower, and means for causing said movement of said closure.

4. A drier comprising a pair of concentric, vertical, spaced, tubular screen walls disposed one within the other providing vertically extending cylindrical space between them for material to be dried and a vertical cylindrical flue within the inner of said walls for heated air, a stationary top wall supported on the upper end of said inner screen wall and terminating at its edges adjacent the upper edges of said inner wall, feed means for supplying material to be dried into the upper end of the said cylindrical space, a closure within said inner screen wall extending horizontally across said flue supported for vertical reciprocable movement between the upper and lower ends of said inner screen wall, movable discharge means adjacent the lower end of said cylindrical space for withdrawing said material from said space upon movement of said discharge means, means for connecting said closure and said discharge means for effecting simultaneous downward movement of said closure and movement of said discharge means at a rate of speed for maintaining said closure substantially even with the upper level of material in said tubular space when said feed means is inoperative and said discharge means is operative for withdrawing material from said space.

5. A drier comprising a pair of concentric, vertical, spaced, tubular screen walls disposed one within the other providing vertically extending cylindrical space between them for material to be dried and a vertical cylindrical flue within the inner of said walls for heated air, a stationary top wall supported on the upper end of said inner screen wall and terminating at its edges adjacent the upper edges of said inner wall, feed means for supplying material to be dried into the upper end of the said cylindrical space, a closure within said inner screen wall extending horizontally across said flue supported for vertical reciprocable movement between the upper and lower ends of said inner screen wall, movable discharge means adjacent the lower end of said cylindrical space for withdrawing said material from said space upon movement of said discharge means, means for connecting said closure and said discharge means for effecting simultaneous downward movement of said closure and movement of said discharge means at a rate of speed for maintaining said closure substantially even with the upper level of material in said tubular space when said feed means is inoperative and said discharge means is operative for withdrawing material from said space, said means for connecting said closure and said discharge means including a cable suspending said closure within said inner screen and a winding drum for winding and unwinding said cable and power means for said drum connected with said discharge means for actuating said drum and said discharge means.

6. A drier comprising a pair of concentric, vertical, spaced, tubular screen, walls disposed one within the other providing vertically extending cylindrical space between them for material to be dried and a vertical cylindrical flue within the inner of said walls for heated air, a stationary top wall supported on the upper end of said inner screen wall and terminating at its edges adjacent the upper edges of said inner wall, feed means for supplying material to be dried into the upper end of the said cylindrical space, a closure within said inner screen wall extending horizontally across said flue supported for vertical reciprocable movement between the upper and lower ends of said inner screen wall, movable discharge means adjacent the lower end of said cylindrical space for withdrawing said material from said space upon movement of said discharge means, means for connecting said closure and said discharge means for effecting simultaneous downward movement of said closure and movement of said discharge means at a rate of speed for maintaining said closure substantially even with the upper level of material in said tubular space when said feed means is inoperative and said discharge means is operative for withdrawing material from said space, said discharge means comprising a plurality of varied rollers, means for simultaneously rotating said rollers, and a plurality of conduits extending from the lower end of said tubular space with one of said rollers within each conduit for obstructing passage of material therepast when such roller is stationary and for passing a predetermined measured uniform amount of said material per minute when said rollers are rotated at a predetermined rate of speed.

GEORGE L. HURST.
MOWATT M. HURST.

REFERENCES CITED

The following references are of record in the file of this patent:

UNITED STATES PATENTS

| Number | Name | Date |
| --- | --- | --- |
| 51,169 | Gecmen | Nov. 28, 1865 |
| 121,847 | Chichester et al. | Dec. 12, 1871 |
| 254,968 | Heffner | Mar. 14, 1882 |
| 1,150,996 | Carr | Aug. 24, 1915 |
| 1,482,812 | Roberts | Feb. 5, 1924 |
| 1,621,651 | Bauer | Mar. 22, 1927 |
| 1,669,012 | Nordstrom | May 8, 1928 |
| 1,711,547 | Miller | May 7, 1929 |
| 1,981,433 | Shodron | Nov. 20, 1934 |
| 1,981,434 | Shodron | Nov. 20, 1934 |
| 1,994,654 | Kreutzer | Mar. 19, 1935 |
| 1,995,551 | Shodron | Mar. 26, 1935 |
| 2,299,299 | Bills | Oct. 20, 1942 |

FOREIGN PATENTS

| Number | Country | Date |
| --- | --- | --- |
| 145,224 | Great Britain | July 2, 1920 |
| 466,337 | Germany | Oct. 6, 1928 |